Sept. 1, 1942.  J. G. REID  2,294,422
SOLDERING MACHINE
Filed Dec. 19, 1939
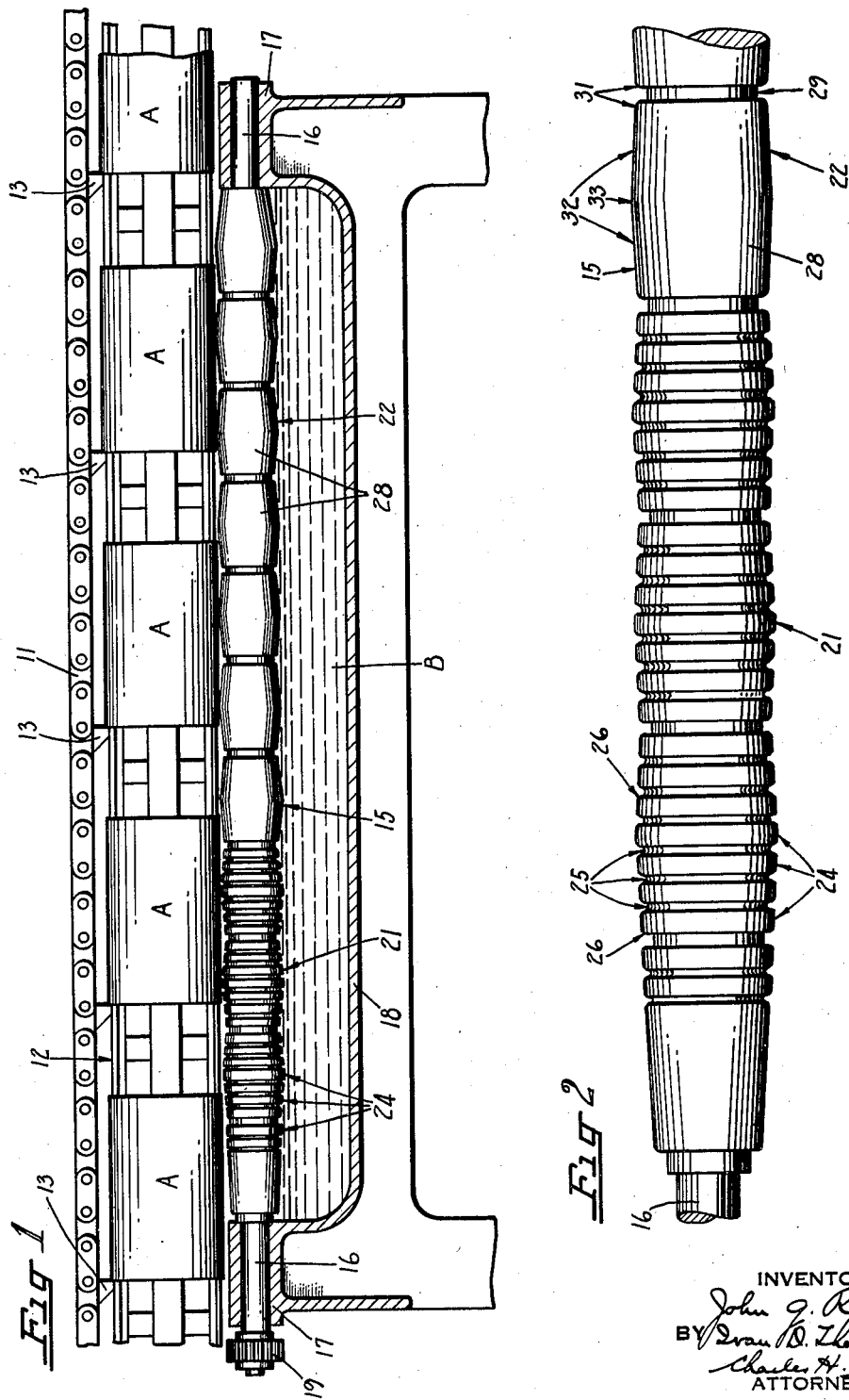
INVENTOR
John G. Reid
BY
ATTORNEYS Patented Sept. 1, 1942

2,294,422

UNITED STATES PATENT OFFICE 2,294,422

SOLDERING MACHINE

John G. Reid, San Jose, Calif., assignor to American Can Company, New York, N. Y., a corporation of New Jersey Application December 19, 1939, Serial No. 310,074

3 Claims. (Cl. 113—61)

The present invention relates to machines for soldering the side seams of container or can bodies and has particular reference to preheating the side seams for the soldering operation.

In the soldering of side seams in sheet metal can bodies it has been found that the sudden application of the full quantity of solder at full heat tends to suddenly expand the parts of the seam and cause them to unduly spring open. This is especially the case in side seams of the lock and lap type so well known in the can making art. Preheating of the can bodies prior to soldering has been practiced to some extent but heretofore this has required a separate station with its necessary operating mechanism in the soldering machine.

The instant invention contemplates eliminating a separate outside preheating station and effecting the preheating gradually in the regular solder bath so that the seam will be heated slowly.

An object, therefore, of the invention is the provision in a can body side seam soldering machine of a solder roll operating in a bath of molten solder and formed with a preheating section which contacts the side seams of can bodies passing along the roll and thereby gradually preheats them so that opening of the seams prior to soldering will be prevented.

Another object is the provision of such a preheating solder roll wherein the preheating portion of the roll drains away the solder picked up by it as it rotates in the solder bath and thereby applies only a minimum quantity of solder, if any, to the seam during its preheating so that the preheating will be effected mainly by the conducted and radiated heat of the solder roller and the solder bath and not by direct heat of molten solder applied to the seam. This insures a slower and more thorough heating of the seam parts.

Another object is the provision of a preheating solder roll of the described character wherein less solder is used when applied to the seam and a more uniformly distributed coating is obtained because of the slow and thorough preheating of the seam.

Numerous other objects and advantages of the invention will be apparent as it is better understood from the following description, which, taken in connection with the accompanying drawing, discloses a preferred embodiment thereof.

Referring to the drawing:

Figure 1 is a sectional view of the principal parts of a usual soldering station of a can body soldering machine including a solder roll embodying the instant invention, the view also showing a procession of can bodies passing through the station; and Fig. 2 is an enlarged fragmentary elevation of the solder roll showing in particular the can seam preheating section thereof.

As a preferred embodiment of the invention the drawing illustrates principal parts of a can body side seam soldering machine of the character disclosed in United States Patent 1,716,671, issued June 11, 1929, to W. E. Taylor, on Agitated solder bath. In such a machine partially completed can bodies A having side seams adapted to be soldered are propelled by an endless chain conveyor 11 along a supporting horn or mandrel 12 in a continuously moving procession. The conveyor is provided with dogs 13 which are spaced along the length of the chain and which engage behind the can bodies.

The moving can bodies A advance longitudinally of and with their side seam sections in engagement with a rotatable preheating and soldering roll 15. This roll is formed with trunnions 16 which are journaled in bearings 17 formed in the end wall sections of a reservoir 18. The reservoir contains a bath of molten solder B which is maintained in its molten condition in any suitable manner such for example as disclosed in the above mentioned patent.

The roll 15 is continuously rotated in the molten solder. For this purpose there is provided a gear 19 which is carried on one of the trunnions 16 and which may be rotated in any suitable manner.

The roll 15 is divided into two sections, namely, a side seam preheating section 21 and a side seam soldering section 22. The preheating section is preferably about one third the length of the roll. This preheating section is divided into a plurality of barrel shaped groups of narrow annular ridge members 24 equally spaced along the length of the roll as best shown in Fig. 2. These ridges are set off by annular grooves 25. The middle ridge 24 of each group has the greatest outside diameter and the adjacent ridges on each side of the middle ridge gradually taper off with decreasing diameters to effect the barrel shape of the group as a whole.

Hence when the moving can bodies A traverse this ridged preheating section of the roll the latter carries up the heat of the molten solder in which the roll rotates and applies it to the side seams of the bodies by radiation and conduction. Not all of the ridges of each group directly contact the can bodies but these ridges maintain the heat in the roll and radiate it to the bodies. In order to prevent jamming of the moving can bodies against the ridges the corner edges of each ridge are rounded off in smooth surfaces 26.

Thus the ridges which contact and those which only are near to the can bodies gradually heat the side seams in such a slow and thorough manner that the expansion of the seam parts is effected uniformly. This is of considerable importance in regard to bodies having seams of the lock and lap type, in that the lap portions of the seam often spring apart when heated too suddenly. It is this uniform expansion of the seam parts which prevents undue opening of the seam and thereby properly prepares the seam for the reception of the solder as will be hereinafter more fully explained.

It will be noted with this construction of preheating roll, that the major portion of the heat is applied only to the side seam of the can body and not to the body as a whole. This has considerable bearing on the following soldering operation in that with a side seam thus prepared the solder more readily sticks only to the side seam. This results in a narrow line of uniformly distributed solder along the side seam, which result is greatly desired for the sake of appearance and also for economy in the use of solder.

In such a construction of preheating roll it might be expected that the ridges 24 will carry up solder out of the reservoir and apply too great a quantity to the side seam during preheating. However, this is not the case. It has been found that the solder picked up readily drains off the ridges because of their narrowness and their smoothly rounded corner edges. This draining solder quickly runs off into the grooves 25 and drains back into the reservoir. Hence the small amount of the solder which is applied to the side seam during this preheating stage is not sufficient to warp the can body by too sudden a heating.

After preheating of the side seams the can bodies traverse the soldering section 22 of the roll. This section is preferably that of a standard solder roll as shown in the above mentioned patent. The soldering section preferably includes a plurality of wide and annular barrel shaped sections 28 which are separated by single grooves 29. The corner edges of these sections are also rounded off in smoothly curved surfaces 31. The sections are formed with tapered surfaces 32 which slope up from the grooves 29 toward the middle of the section where they terminate in a peak 33 where the diameter is of greatest dimension.

Hence as the roll rotates in the solder bath the tapered surfaces 32 pick up the solder and carry it up onto the side seams of the passing can bodies. The tapered surfaces of the roll sections insure that the solder is wiped well into the seam parts, especially the lapped portions of bodies having the well known lock and lap type of side seam. This soldering portion of the operation is a usual can making feature.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a sheet metal can body side seam soldering machine, the combination of a reservoir for retaining a bath of molten solder, means for conveying can bodies across said reservoir, and a rotatable roll in said reservoir in engagement with said can bodies, said roll having a side seam soldering section and a side seam preheating section disposed in advance of said soldering section, said preheating section including a plurality of closely spaced annular ridge members arranged to minimize picking up of the solder as they rotate therein, said ridge members gradually increasing in diameter from the opposite ends of said preheating section to the center thereof so that the side seams of moving can bodies are contacted by ridge members only at the longitudinal center portion of said section, whereby said can body side seams are gradually preheated by the heat of the solder bath imparted to said ridge members, so that undue opening of the seams by warping of the body will be prevented, said soldering section of the roll being adapted to pick up the molten solder in the bath and apply it to the preheated side seams in a minimum uniformly distributed coating.

2. In a sheet metal can body side seam soldering machine, the combination of a reservoir for retaining a bath of molten solder, means for conveying can bodies across said reservoir, and a rotatable roll disposed in said reservoir for engagement with said can bodies, means for rotating said roll, said roll having a side seam soldering section and a side seam preheating section disposed in advance of said soldering section, said preheating section including a plurality of groups of spaced annular ridge members, the ridge members of each group increasing in diameter from the ends thereof to the middle for conducting the heat of the molten solder in which said ridge members rotate to the can body side seams, while draining away the solder from the seam so that the seam will be slowly and thoroughly heated to prevent undue opening thereof prior to soldering, said soldering section of the roll being adapted to pick up the molten solder in the bath and apply it to the preheated side seams in a minimum uniformly distributed coating.

3. In a sheet metal can body side seam soldering machine, the combination of a reservoir for retaining a bath of molten solder, means for conveying can bodies across said reservoir, and a roll rotatably mounted in said reservoir and disposed parallel to the path of travel of the bodies passing thereover, said roll comprising a section for applying solder from the bath to said seams and a preheating section disposed in advance of and spaced longitudinally from said solder applying section for conveying heated solder from the bath to adjacent said seams to gradually preheat the latter by radiated heat from the hot solder and the hot roll preheating section prior to the application of solder by the soldering section, the structure of the preheating section being such that any solder applied thereby to said seams is materially less than that applied by said soldering section, and the length of the preheating section for any given size of can being such that the seams are slowly and thoroughly preheated to prevent undue warping and springing apart thereof prior to and during the application of solder by the soldering section.

JOHN G. REID.